United States Patent [19]

Cook

[11] 4,086,634
[45] Apr. 25, 1978

[54] METHOD AND APPARATUS FOR PREPARING RECORDED PROGRAM MATERIAL TO PREVENT UNAUTHORIZED DUPLICATION BY MAGNETIC TAPE RECORDING

[75] Inventor: Emory G. Cook, Wilton, Conn.

[73] Assignee: Cook Laboratories, Inc., Norwalk, Conn.

[21] Appl. No.: 600,455

[22] Filed: Jul. 30, 1975

[51] Int. Cl.$^2$ .......................... G11B 15/04; G11B 5/02
[52] U.S. Cl. .......................................... 360/60; 360/27
[58] Field of Search ....................... 360/60, 15, 17, 27; 179/100.11

[56] References Cited

U.S. PATENT DOCUMENTS

| 3,315,242 | 4/1967 | Hadded | 360/17 |
|---|---|---|---|
| 3,476,885 | 11/1969 | Shiber et al. | 360/17 |
| 3,696,219 | 10/1972 | Arimura | 360/17 |

*Primary Examiner*—Vincent P. Canney
*Attorney, Agent, or Firm*—Parmelee, Johnson, Bollinger & Bramblett

[57] ABSTRACT

Unauthorized duplication of recorded audible program material upon magnetic tape, commonly known as tape piracy, is prevented and rendered detectable by the present method and apparatus for preparing the program material. The method and apparatus prepare recorded audible program material by generating a high frequency modulated signal which varies in a predetermined manner over a selected spectrum of frequencies, and by recording the modulated signal together with the audible program material so that subsequent copying of the program material and modulated signal onto magnetic tape with conventional high frequency bias will produce on the copied tape detectable and identifiable interference signals arising between the modulated signal and the conventional recording bias. The modulated signal may sweep a range of frequencies at a rate which will produce an audible playback noise spoiling the copied tape, and the modulated signal can be coded to identify the origin of the program material. In one embodiment, the method and apparatus record the modulated signal in superposition upon recorded program material, applying the modulated signal in square wave form to reduce modulation noise and rocking the recording head to intercept any azimuth deviation of subsequent playback means. In another embodiment, a frequency modulated signal is arranged to form the bias signal during the recording of the program material. The method and apparatus do not interfere with normal playback of the recorded program material since the modulated signal is beyond the audible range, but when copying onto magnetic tape is attempted, unacceptable interference signals, such as beat signals and cross-modulation signals, arise either to spoil the copy or to mark it in a detectable fashion as pirated copy.

26 Claims, 9 Drawing Figures

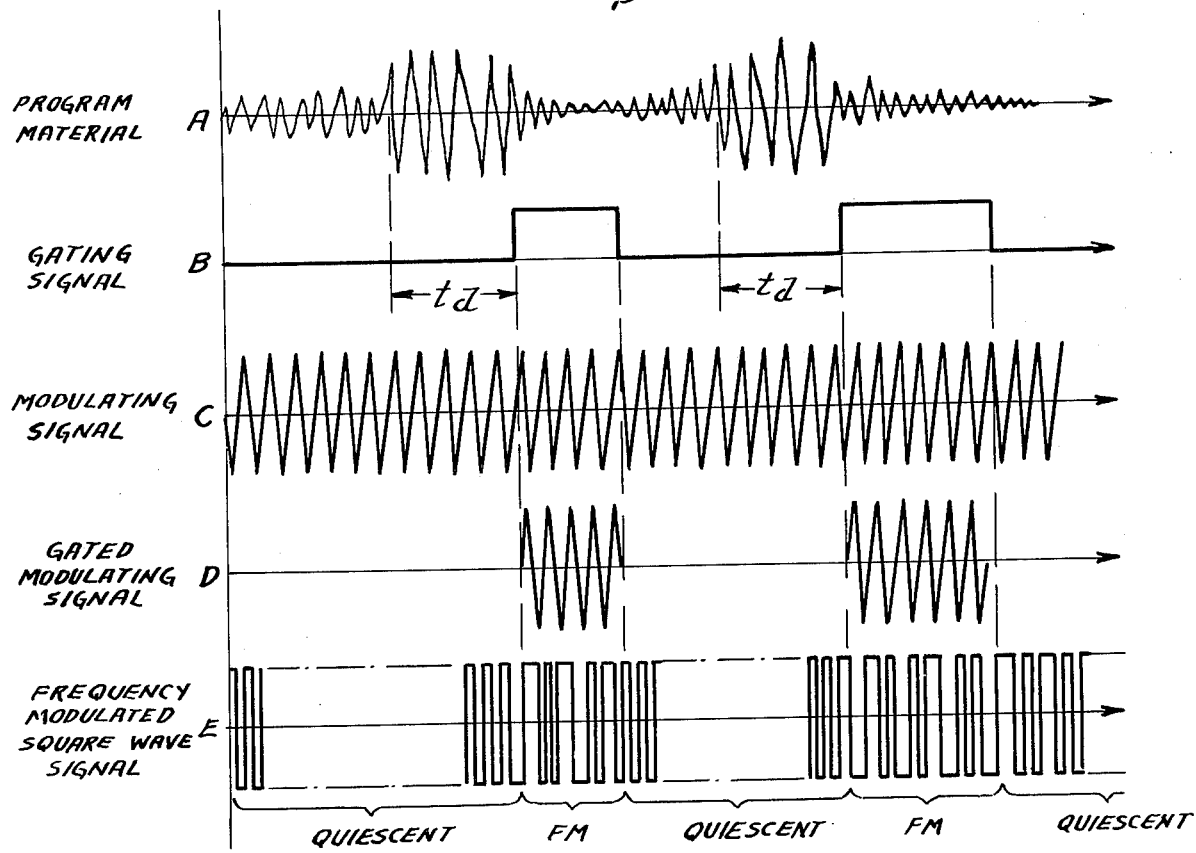
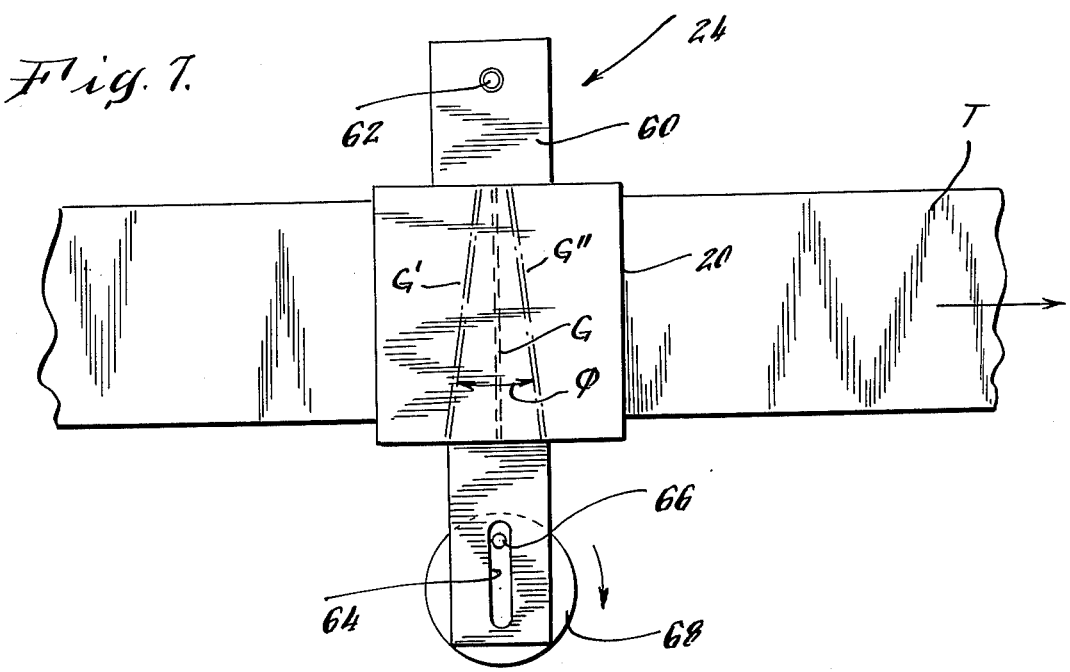

METHOD AND APPARATUS FOR PREPARING RECORDED PROGRAM MATERIAL TO PREVENT UNAUTHORIZED DUPLICATION BY MAGNETIC TAPE RECORDING

BACKGROUND OF THE INVENTION

This invention relates to the recording of program material, such as music, voice and the like, and particularly to the recording of materials which are susceptible to unauthorized duplication or copying using the medium of magnetic tape.

Unauthorized copying or duplication of program material sold by publishers or their licensees is widespread in spite of its illegality and is difficult to police effectively. The result of such copying is to cut seriously into publishers' revenues and to discourage production of expensive, high quality programs. Such unauthorized copying takes place for the most part through the use of tape cassettes as the medium for generating the unauthorized copies. Other forms of tape are sometimes used, but the tape medium in general, and tape cassettes in particular, account for most of this activity.

Accordingly, it is desirable to develop techniques and equipment for preparing the original recordings of the program material to discourage or prevent the making of unauthorized copies, or at least to leave traces or "fingerprints" on the copies which will supply irrefutable proof of the origin of the program material and the fact that unauthorized copies have been made.

Any technique for preparing original program material so as to prevent or render detectable its duplication upon tape should satisfy several criteria. The technique should be simple and economical to use. In addition, the technique should not interfere with normal playback of the material by the possessor of an authorized recording. Moreover, the technique should be one that is difficult for a tape pirate to nullify or sidestep. Finally, the technique preferably should spoil the unauthorized copies so that they are unsatisfactory and unsaleable, or at least should permit ready identification of a tape recording as an unauthorized copy.

Heretofore, no techniques have been developed which satisfy the foregoing criteria.

SUMMARY OF THE INVENTION

It is a principal object of this invention to provide an improved method and apparatus for preparing recorded program material so as to discourage unauthorized copies made by magnetic tape recording. It is a specific object of the invention to provide such a method and apparatus which are simple and economical to use, which do not interfere with normal playback of the program material, which are difficult to nullify, and which spoil or render detectable any unauthorized magnetic tape recording duplications thereof. Still another object of the invention is to provide a method and apparatus of the type described for preparing recorded program material which is more suitable for commercial use.

In attaining the foregoing objects, the present invention recognizes and utilizes the conventional magnetic tape recording procedure of applying an a-c bias signal to the program signal during recording. Tape and cassette recorders, as well as the high speed duplicators which are commonly used to effect copies, must use this high frequency signal known as bias in order to record effectively on magnetic tape. The bias is usually about four or more times the frequency of the highest frequency within the information band of the program material to be recorded. For example, if a band of audio frequencies from 50–15,000 Hertz is to be recorded, then one would expect to find a bias frequency of from 60,000 to 100,000 Hertz, or even higher. Normally, bias frequencies are beyond the audible range, i.e., "supersonic," and are not heard on playback of the recording even were they to be reproduced by the loudspeaker. Bias frequencies may vary considerably among different recording devices. For example, there are specialized instances in which information frequencies do not exceed 5,000 Hertz. Very low bias frequencies may be employed in recording when the program content is limited to 5,000 Hertz. Thus although one knows a-c bias will be used, one can never be sure of the location of the bias frequency of the equipment operated by an unauthorized duplicator.

In a preferred embodiment of the invention to be described hereinbelow in detail, audible program material is prepared in accordance with a method which comprises generating a high frequency signal which is modulated, e.g., frequency modulated, to vary in a predetermined manner over a selected spectrum of frequencies. The high frequency modulated signal is recorded together with the audible program material, and thus when attempts are made to copy the recorded program material onto magnetic tape, there will arise detectable interference signals, such as beat signals and cross modulation signals, between the recorded modulated signal and the copier's recording bias, at whatever frequency within a broad range that that bias is operated. This arrangement does not interfere with normal playback of the program material yet easily permits detection of unauthorized copies. By choosing the sweep rate of the modulated signal to be within the audible passband, audible interference signals will appear, spoiling the audible quality of the copy. Coding of the frequency modulated signal can be used to identify the origin of the program material.

In further detail, the modulated signal is recorded in one embodiment in superposition upon prerecorded program material, preferably using a square wave signal to reduce modulation noise, preferably using a masking technique for superposing the modulated signal during passages of program material capable of hiding the modulated signal, and preferably rocking the recording head to vary the azimuth of the superposed signal to allow for variations in alignment of playback heads. In another embodiment, the modulated signal is recorded as a bias signal for the program material at the time it is recorded.

Other objects, aspects and advantages of the invention will be pointed out in, or apparent from, the detailed description hereinbelow, considered together with the following drawings.

DESCRIPTION OF THE DRAWINGS

FIG. 4, including A through E, is a graph illustrating wave forms appearing in the circuit of FIG. 1;

FIG. 7 is a view illustrating apparatus for rocking the second recording head shown in FIG. 1;

DESCRIPTION OF THE PREFERRED EMBODIMENTS

Figure 1:
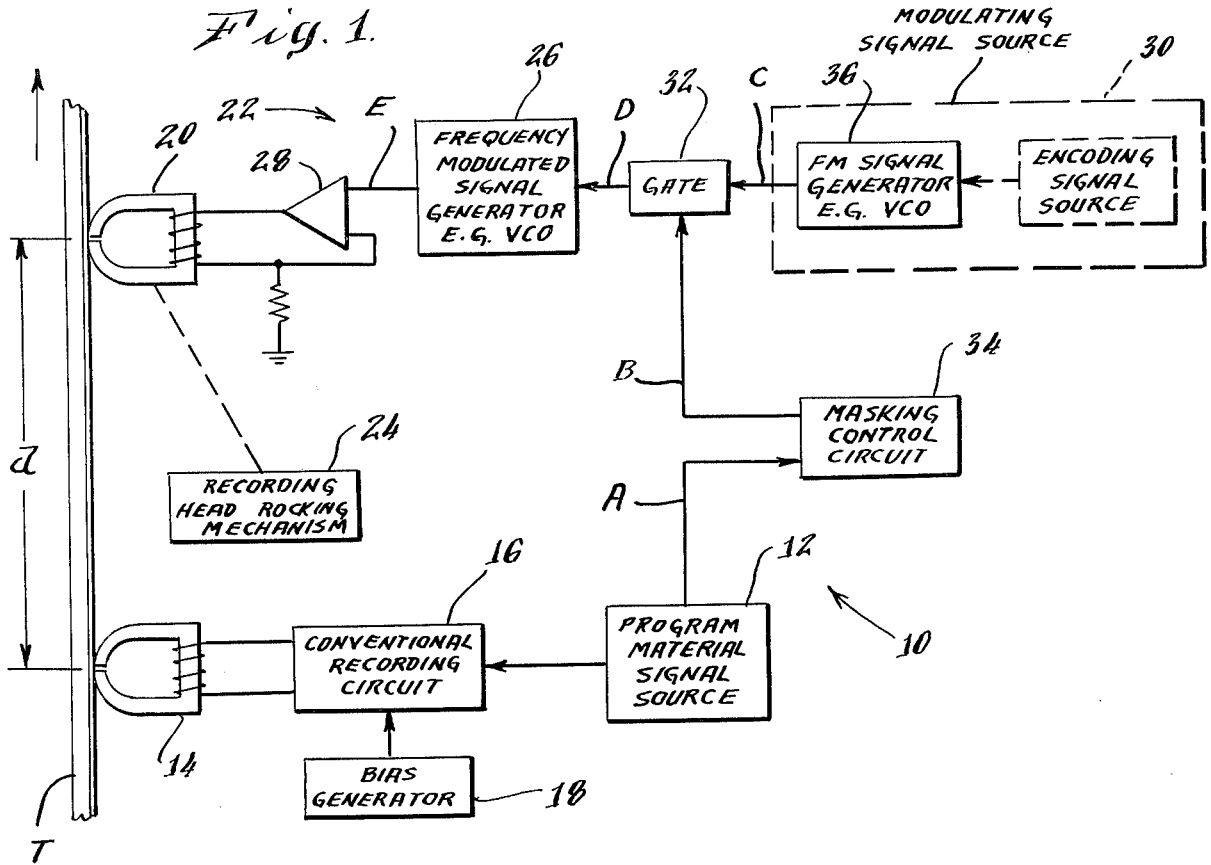
FIG. 1 is a schematic diagram of apparatus for preparing recorded program material in accordance with the present invention.

FIG. 1 illustrates in schematic form an apparatus 10 arranged in accordance with the present invention to prepare recorded audible program material upon a magnetic tape T so that unauthorized copies of the recorded program material which subsequently are made by magnetic tape recording with conventional high frequency bias will be spoiled or rendered detectable. In recording apparatus 10, the program material signal, obtained from a source 12, is first recorded on tape T by means of a conventional recording head 14 driven by a conventional recording circuit 16 receiving conventional bias from a generator 18. The tape T, transported by conventional mechanisms (not shown), then has a second signal superimposed upon the recorded program material by means of a second recording head 20 which is driven by the signal generating circuit arrangement indicated generally at 22, and which is rocked in azimuth by a mechanism 24 to be described below.

The superimposed signal generated by circuit 22 and applied to tape T by recording head 20 is a high frequency signal which is modulated to vary in a predetermined manner over a selected spectrum of frequencies in order to develop interference signals between the modulated signal and the conventional recording bias used in copying. The character of the superimposed modulated signal should be such that it will not interfere with normal playback of the program material but still will generate acceptable interference signals. Accordingly, the particular characteristics of the superimposed signal should be correlated with both the characteristics of the program material to be recorded and the equipment with which it is recorded.

The spectrum of frequencies over which the superimposed signal varies should be chosen with the following criteria in mind. Interference with the recorded program material should be avoided so as not to interfere with normal playback of the program material. The spectrum should be broad enough to make it reasonably likely that interference signals of its harmonics which are generated by distortion in the playback amplifier will arise for expectable frequencies of bias used by copiers.

One suitable method for varying the superimposed signal, in relation to a give information passband occupied by the program material, is to vary the superimposed modulated signal in a spectrum just outside and beyond the information passband. For example, in recording upon audio tape cassettes with typical information passbands of 50 to 10,000 Hertz, an appropriate superimposed signal would be one that is frequency modulated to sweep, either at a fixed or variable rate, from 12,000 to 20,000 Hertz.

To render it very difficult for the copier to nullify the superimposed modulated signal by filtering or the like, it is possible to use a masking method and apparatus as will be described below, to allow the modulation spectrum to make incursions into the information passband by controlling such incursions so that they occur only in superposition upon passages of the program material which have suitable frequency and amplitude to prevent interference by the superposed signal with the listener's normal playback of the program material.

The superimposed modulated signal is varied in a selected predetermined manner to produce interference signals which degrade the copy, indicate with certainty the origin of the copied program material, or both. One method of varying the modulated signal is to cause it to sweep through the selected spectrum at a sweep rate within the audio passband, so that interference signals with the copier's fixed bias will be generated at the same rate to develop an audio "buzz" spoiling the copied tape. Another method of varying the modulated signal, to make the source of the program material incontrovertible, is to encode the modulation using, e.g. Morse International Code dots and dashes, to spell out an identifying piece of information such as the initials of the publisher. The modulated signal also may be varied using compound modulation. For example, a frequency modulation at very low frequencies of an audio modulating frequency will produce a characteristic and readily identifiable signal, sounding as though a vibrato were applied to the test tone of an FM transmitter. Varying of the modulated signal in other predetermined manners to produce characteristic and identifiable interference signals is possible and will occur to those preparing recordings in accordance with the present invention.

The form of modulation used upon the superimposed signal also may be selected to obtain desired results. Amplitude modulation produces high frequency signals upon tape. Frequency modulation generally is preferred because it more effectively maintains the playback amplifier near saturation and distortion, thus generating a maximum of interfering harmonics. Any form of modulation prevents filtering by a copier.

Figure 2:
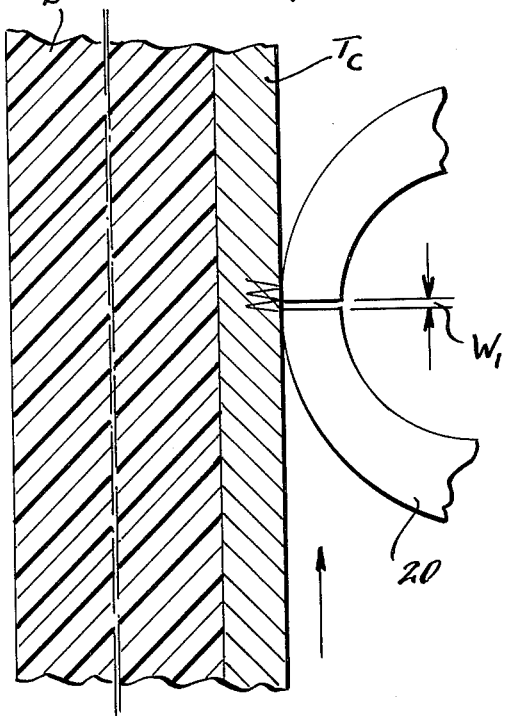
FIGS. 2 and 3 are detailed diagrams of recording heads used in preparing recorded program material in the apparatus of FIG. 1.

The wave shape and magnitude of the superimposed modulated signal are selected to correlate with the particular tape and recording equipment that is used. As shown in FIG. 2, a tape T is formed with a plastic backing Tb and a magnetic coating Tc containing magnetic particles of a particular type, e.g., gammaferric, chromium dioxide, and the like. High frequency signals in normal tape recording reside predominantly in the stratum or layer of magnetic coating which lies nearest the eventual playback head. Accordingly, for some conditions, the recording head 20 used to apply the superimposed high frequency modulated signal may employ a small gap width to penetrate a shallow depth of the magnetic coating of the tape. It has been discovered that superimposed signals of high frequency and a sinusoidal waveshape may be applied, as shown in FIG. 2, using recording heads 20 having very narrow gap widths W1 of about 10–15 microinches when the magnetic coating Tc of the tape has low acicularity and high surface finish such as is found, for example, on chromium dioxide coatings. A high frequency signal superimposed in this fashion and penetrating principally only the outer layer or "skin" of the magnetic coating Tc of the tape functions effectively for the purpose of developing interference signals to prevent copying while minimizing interference with the recorded program material. The application of the high frequency modulated signal across such a narrow gap width produces a minimum of erasure attenuation of previously recorded high frequency audio program content. The minimum high frequency attenuation, of about 6 to 8 db, can easily be compensated by using commonplace pre-emphasis techniques.

Figure 3:
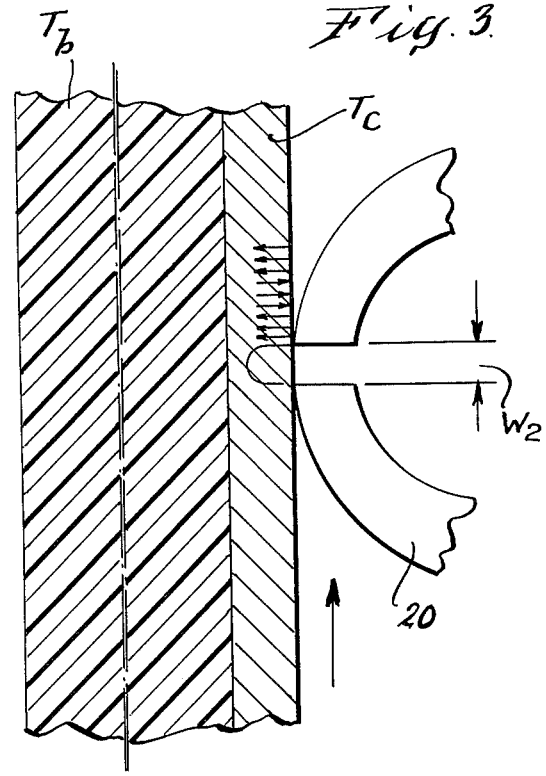

When gammaferric tapes are used for recording, and when recording heads 20 with larger and more practical gap widths W2 of 50 microinches or more are used as shown in FIG. 3, the phenomenon known as modulation noise appears. Such noise is remanent on the tape at greater depths within the magnetic coating Tc, and is believed to be the result of a random disorientation of magnetic spins in the deeper layers of the magnetic oxide coating due to the fact that lines of magnetic force across a wider gap have large vectorial components in the direction of travel of the tape, and due to the presence of particles of random coercivities.

It has been discovered that modulation noise can be uniformly avoided, even with larger gap widths W2 and varied tape types, by applying particular current wave forms to the winding of superimposing recording head 20. The current waveforms, and hence the waveforms of induced flux in the coating Tc, which have been discovered to achieve the surprising and beneficial disappearance of modulation noise are waveforms having very short transition times and flat, i.e. nonvarying, intermediate dwell regions. Such waveforms, known generally as square waves, include standard square waves, alternating positive and negative pulses, stepped waves, and the like. Using the standard square waveform as an example, it has been found that best results are obtained when the transition time is 1/6 or less of the dwell time. The waveform should be substantially flat during the dwell period to avoid approximation of sinusoidal or ramp waves, and the waveform should be symmetrical with respect to the zero flux axis to avoid magnetizing playback heads. For best results, the magnitude of the superimposed square wave should be adjusted to a level which gives the peak high frequency output upon playback.

The reasons why waveforms of the square wave family eliminate modulation noise are not fully understood, but it is believed that the alternating flux fields of constant strength intercept and uniformly treat all magnetic particles of randomly varying coercivities in the entire 200 microinch effective depth of the coating Tc, and thus randomness in the coercivities of particles has a considerably reduced effect in relation to the varying flux fields of a sine wave.

Referring again to FIG. 1, in order to provide a wide range of applicability and a maximum of copy-preventing treatment, the illustrated recording apparatus 10 uses a second recording head 20 with a gap width of about 50 microinches, and a signal generating circuit 22 arranged to provide a frequency modulated square wave current signal to the winding of superimposing recording head 20. As shown in FIG. 1, a frequency modulated square wave voltage signal is delivered at point E from a frequency modulated square wave function generator 26 comprising, for example, a voltage controlled oscillator having a quiescent frequency above the passband of the program material, e.g. 13,000 Hertz for cassettes with a passband of 50 Hertz to 10,000 Hertz. The voltage signal at point E is converted by means of a feedback amplifier 28 to a corresponding frequency modulated square wave current signal to be applied through the winding of recording head 22.

Modulated signal generator 26 is governed by a modulating signal appearing at point D, which is developed by means of a modulating signal source 30, a gate 32 under the control of a gating signal at point B, and a masking control circuit 34 which develops the gating signal at point B in a manner to be described below whenever the program material signal at point A has an appropriate amplitude and frequency to permit masking of incursions into the information passband of the program material. The modulating signal source 30 may be a steady frequency oscillator, or as illustrated, may comprise an FM signal generator 36, such as a VCO, with a sinusoidal output and an audible quiescent frequency, e.g., 1,000 Hertz, under the control of an encoding signal source. The encoding source may generate an interrupting code, or a signal of low frequency, e.g. 10 Hertz. The amplitude of the modulating signal appearing at point C to be gated to FM signal generator 26 is adjusted to sweep the superimposed signal at recording head 20 through a modulation spectrum of, e.g., 8,000 to 13,000 Hertz for an information passband of 50 to 10,000 Hertz and sweeps the signal at an audible rate of 1,000 Hertz varied at a low frequency, thus producing a vibrato effect.

The waveforms appearing in signal generating circuit 22 are illustrated in FIG. 4. The program material signal at point A is processed by masking control circuit 34 to generate a gating signal at point B whenever selected combinations of amplitude and frequency are present. The gating signal at point B is time delayed in relation to the program material at point A by a period $t_d = d/s$ to allow the tape to travel the distance d between recording heads 14 and 20 at a speed $s$. The modulating signal from source 30 is applied steadily to point C, and a gated modulating signal then appears at point D at the input of FM signal generator 26. The modulated voltage signal at point E then is a signal of uniform amplitude, being frequency modulated during the gating intervals established by masking control circuit 30, and operating at the quiescent frequency of FM generator 26 at other times.

Figure 5:
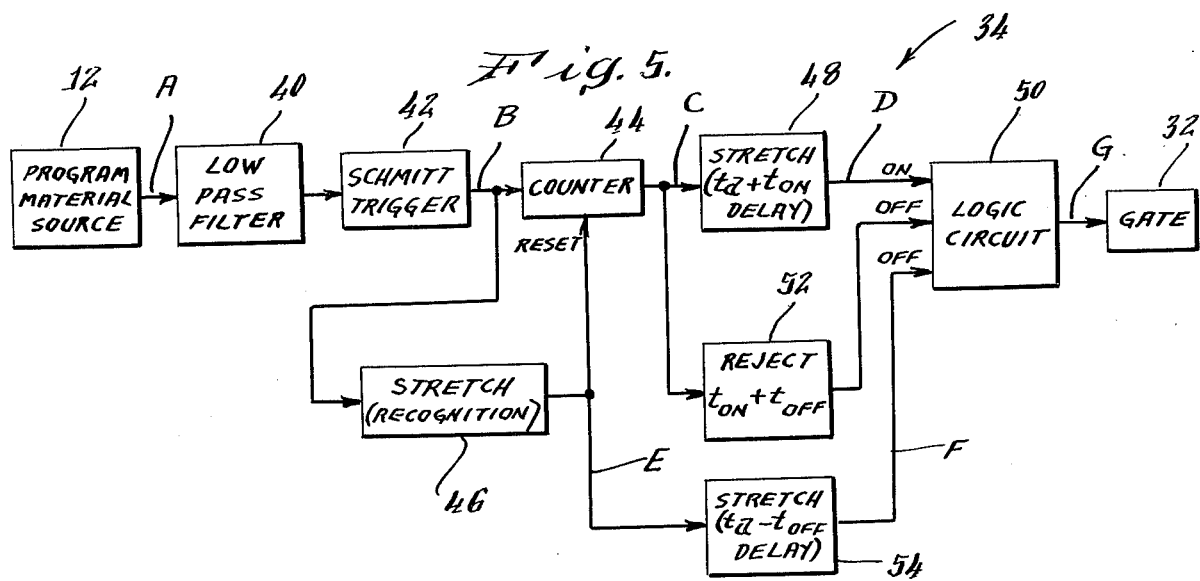
FIG. 5 including A through G is a schematic diagram illustrating the masking control portion of the apparatus of FIG. 1.

The masking control circuit 34 of recording apparatus 10 is shown in simplified schematic form in FIG. 5. The purpose of the circuit is to recognize program material sound bursts with adequate masking properties, and to generate a gating signal tailored to such bursts to allow FM generator 26 to make unnoticed frequency modulated incursions into the information passband. For example, incursions in a spectrum of 8,000 to 13,000 Hertz may be made into an information passband of 50 to 10,000 Hertz. Such incursions are impossible for a pirate to remove, permit strong interference signals to arise, and thus provide effective protection against copying.

Masking control circuit 34 is arranged to detect signal bursts in the frequency range of 500-2,000 Hertz to which the human ear is most sensitive, and to detect such signal bursts which have sufficient amplitude and duration to allow for masking. The circuit is arranged, moreover, to delay the start of the gating signal for a time $t_d + t_{on}$ after the beginning of a signal burst, and to end the gating signal a time $t_d - t_{off}$ after the end of the signal burst, to allow time for the tape T to be transported to recording head 20, and to allow starting and ending time margins $t_{on} + t_{off}$ to ensure effective masking.

Accordingly, masking control circuit 34 comprises an input low pass filter 40 removing frequencies above 2,000 Hertz, a Schmitt trigger 42 with its threshold set at an amplitude level suitable for masking, and a counter 44 arranged to recognize an appropriate signal burst by producing an output when a desired number of successive cycles of speech or music, e.g., 12 pulses, has been counted. Counter 44 is reset by a signal from a pulse stretching circuit 46, which has no output as long as input pulses are applied with sufficient frequency, but has an output whenever too much time elapses between successive pulses from Schmitt trigger 42, a condition which signifies either that the signal burst is over, or that the signal has too low a frequency to be useful for masking. The stretch circuit 46, accordingly, has its duration arranged to provide an output when it receives signals of 500 Hertz or less.

The presence of a recognized signal burst qualified for masking is thus an output from counter 44. This output starts a pulse stretching delay circuit 48, which produces a delayed output $t_d + t_{on}$ seconds thereafter, and maintains the output as long as an input is present. The output from stretch delay circuit 48 goes to a logic circuit 50, which turns on gate 34 to allow modulating incursions unless another logical condition is not met, as will now be described. The counter 44 output also goes to a reject circuit 52, which times the duration of the counter output, and if it does not exceed a time $t_{on} + t_{off}$, sends a signal to logic circuit 50 to prevent a masking signal from going to gate 34. This prevents signal bursts with too short a time duration from qualifying for masking, even if they have the requisite number of cycles as determined by counter 44.

The end of a signal burst, signified by an output from pulse stretching circuit 46, goes to another pulse stretching delay circuit 54, which has an output $t_d - t_{off}$ seconds after an input, and sends its output to logic circuit 50 to turn off gate 34 and end the incursion into the passband of the program material.

The times $t_{on}$ and $t_{off}$ are selected to insure complete bracketing of the signal incursion by the program signal burst. In a typical example, where the delay time $t_d$ was 0.47 seconds, $t_{on}$ was 0.03 seconds, $t_{off}$ was 0.02 seconds, and the reject time $t_{on} + t_{off}$ was 0.05 seconds.

Figure 6:
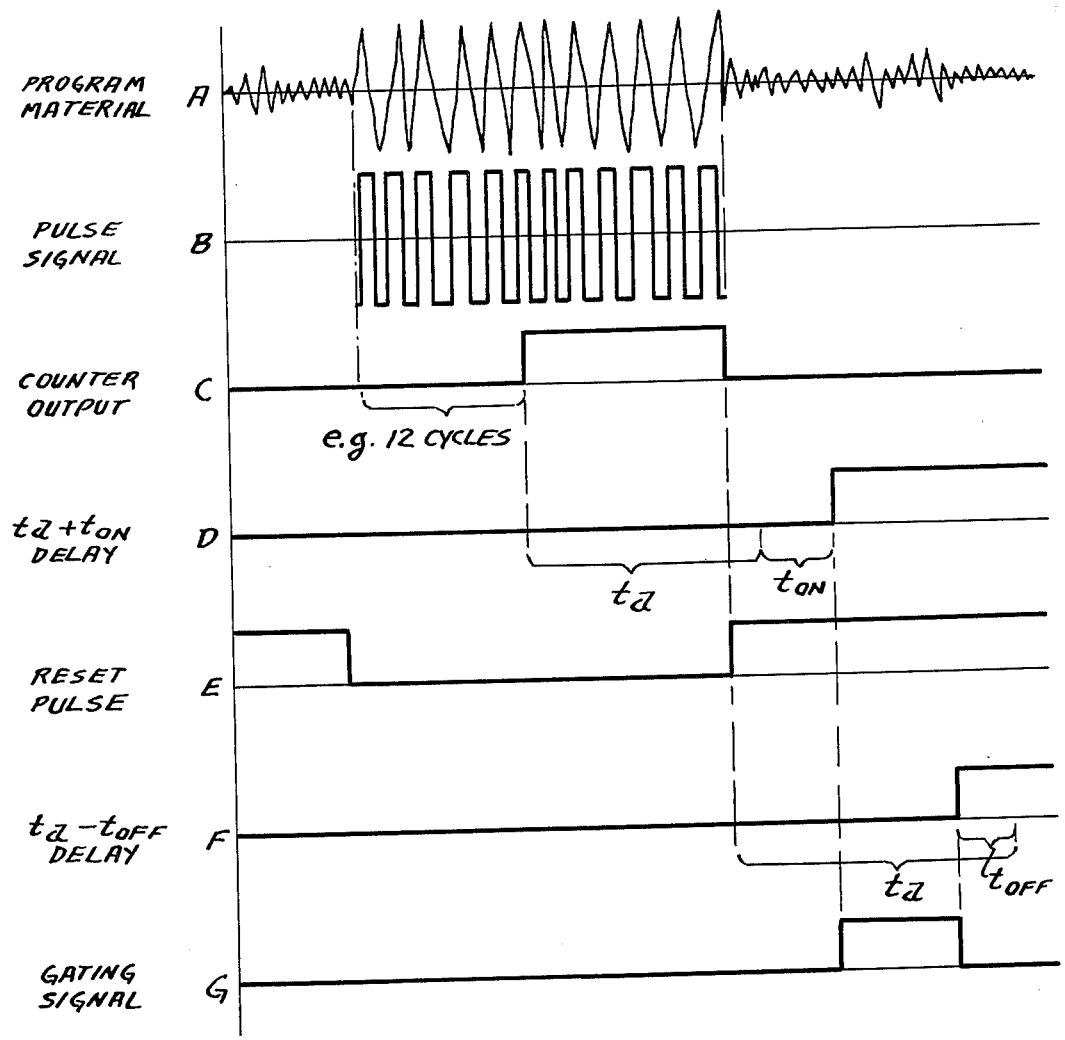
FIG. 6, including A through G, is a graph illustrating wave forms appearing in the masking control circuit of FIG. 5.

Waveforms illustrating the operating of masking control circuit 34 are shown in FIG. 6 for a signal burst which qualifies for masking. As shown there, a gating signal for gate 34 is developed which starts a time $t_d + t_{on}$ after the beginning of a qualified signal burst as recognized by counter 44, and ends a time $t_d - t_{off}$ after the end of the signal burst as recognized by pulse stretching circuit 46.

As previously mentioned, the recording head 20 used to superimpose the modulated spoiling signal upon tape T is rocked about its azimuth by a mechanism 24 to cause the superimposed signal to intercept the playback gap axis of the copier's equipment, even if it is misaligned. Such a rocking mechanism is illustrated in FIG. 7. As shown there, the recording head 20 is mounted upon a bracket 60 which is pivoted about a fixed pin 62 at one side of the head 20, and which has a guide 64 at the other side of the head 20 to receive an eccentrically mounted pin 66 on a rotating member 68. Accordingly, the gap G of recording head 20 will rock between positions G' and G'' through an angle $\phi$ of about 2°–4°, or about 1°–2° to each side of a center position. The frequency of rocking is selected to about 3 or 4 cycles per second, or faster.

Figure 8:
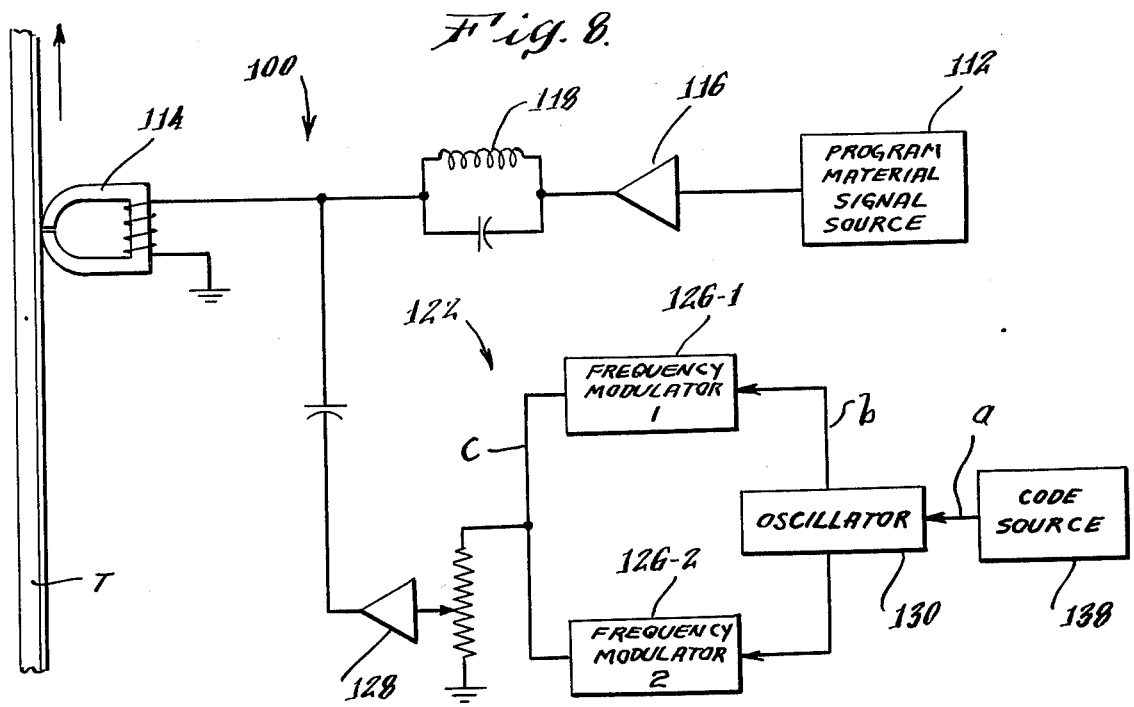
FIG. 8 is a schematic diagram of another embodiment of apparatus for preparing recorded program material in accordance with the present invention.

Another apparatus 100 for preparing recorded program material in accordance with the invention is shown in FIG. 8. In recording apparatus 100, a single recording head 114 is used to record the program material signal from a source 112, in sum with a bias signal from a bias signal generating arrangement 122. The bias signal is a high frequency, frequency modulated signal with spectrum and modulation characteristics selected by applying considerations similar to those used in choosing the signal applied by recording head 20 in recording apparatus 10 of FIG. 1, and thus unacceptable interference signals will arise when a copier attempts to make a magnetic tape recording of the recorded program material using a conventional fixed bias.

Figure 9:
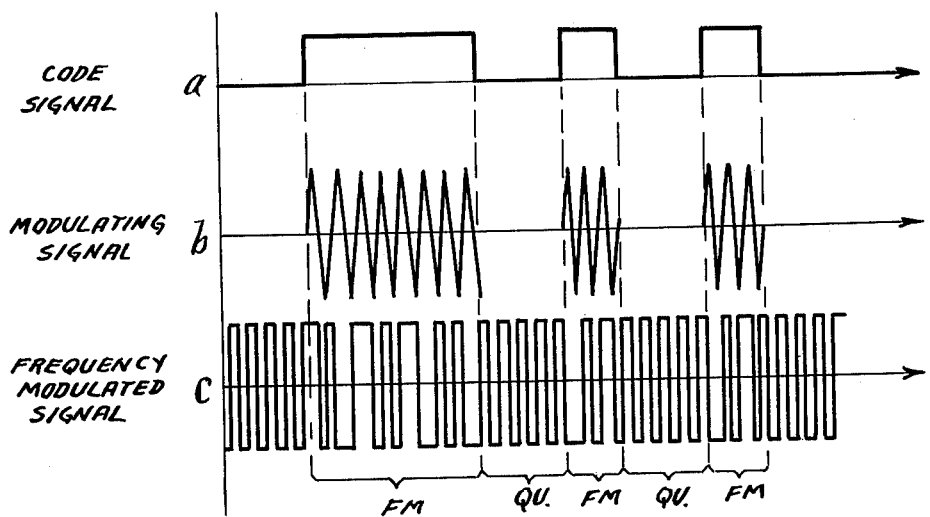
FIG. 9, including A through C, is a graph illustrating wave forms appearing in the apparatus of FIG. 8.

As shown in FIG. 8, the program signal from source 112 is fed through conventional recording means 116 and through a bias trap 118 to summing point 120. The bias signal generating arrangement comprises a feedback amplifier 128 to convert a voltage input to a corresponding current output, a pair of frequency modulated function generators 126-1 and 126-2 such as voltage controlled oscillators, a modulating signal generator 130, and a code generator 138. As shown by the waveforms of FIG. 9, the code generator 138 develops an interrupting type of code and switches the modulating signal generator 130 on and off in accordance therewith. FM generators 126-1 and 126-2 are frequency modulated during the code "on" periods, and operate at their quiescent frequencies f1 and f2 at other times. Preferably, f1 and f2 are selected so that $f1 - f2$ is a fairly constant frequency lying within the information passband of the program material. For example, generator 126-1 may sweep a spectrum of 11,000 to 14,000 Hertz, while generator 126-2 sweeps a spectrum of 12,000 to 15,000 Hertz.

Although the use of two FM generators 126-1 and 126-2 has the advantage of producing greater interference upon copying, a single FM generator, either coded or uncoded, can be used. Moreover, while the modulators shown in FIG. 8 have a sinusoidal output, they may also be arranged to have a square wave type output since it is believed that there may be noise reduction and other benefits from using a square wave type signal, either modulated or unmodulated, in the biasing of program material signals.

Although specific embodiments of the invention have been disclosed herein in detail, it is to be understood that this is for the purpose of illustrating the invention and should not be construed as necessarily limiting the invention since it is apparent that many changes can be made to the disclosed structures to suit particular applications by those skilled in the art. For example, the recording apparatus 10 of FIG. 1 could be arranged to use an interrupting code generator 138 as in apparatus 100, and similarly, the modulation arrangement of apparatus 10 could be used in apparatus 100.

I claim:

1. A method for preparing recorded audible program material which does not interfere with normal playback of the material but which renders detectable any unauthorized copies of the audible program material upon a magnetic recording tape which are made by magnetic tape recording with conventional high frequency bias, said method comprising:
   recording the audible program material for providing a predetermined information passband of frequencies of such recorded material;

generating a high frequency modulated signal which varies in a predetermined manner over a selected spectrum of frequencies lying just above and outside of said information passband of frequencies; and recording the modulated signal together with the audible program material;

whereby copying of the recorded audible program material onto magnetic tape will produce on the tape copy detectable interference signals between the modulated signal and the conventional recording bias signal.

2. A method as claimed in claim 1, wherein the high frequency modulated signal is frequency modulated and varies over the selected spectrum of frequencies at a rate which is within the information passband of the recorded program material, whereby the interference signals arising upon copying will exist as audible signals on the tape copy recording.

3. A method as claimed in claim 1, wherein the step of generating the high frequency modulated signal comprises coding the modulated signal with preselected information, whereby the information will be communicated via the interference signals to the tape copy to identify the origin of the recorded program material from which the tape copy was made.

4. A method as claimed in claim 1 wherein the recording step comprises sensing the presence of program material suitable for audibly masking the modulated signal, and recording the modulated signal during such masking program material.

5. A method as claimed in claim 1 wherein the program material is recorded on magnetic tape, and wherein the step of recording the modulated signal together with the audible program material comprises first recording the audible program material on the magnetic tape and thereafter recording the modulated signal on the magnetic tape to superimpose the modulated signal upon the recorded audible program material.

6. A method as claimed in claim 5 wherein the high frequency modulated signal is in the form of a square wave type of signal, whereby modulation noise is reduced.

7. A method as claimed in claim 5, further comprising the steps of sensing the presence of audible program material portions suitable for audibly masking the modulated signal, and recording the modulated signal in superposition upon such portions, whereby the modulated signal remains hidden and unnoticed during normal playback of the program material.

8. A tape copy detection method as claimed in claim 5 wherein the superimposed modulated signal is recorded by means of a recording head, and wherein the method further comprises rotating the recording head about its azimuth during recording of the modulated signal, whereby said interference signals will be generated despite misalignment of a playback head by means of which an unauthorized tape copy is made.

9. A method as claimed in claim 8 wherein the recording head is rotated by rocking it about a center portion.

10. A magnetic tape copy detection method as claimed in claim 5, wherein the superimposed modulated signal is recorded by a recording head having a narrower gap width than the recording head which was used for first recording the audible program material.

11. A method as claimed in claim 1, wherein the program material is recorded on magnetic tape, and wherein the step of recording the modulated signal together with the audible program material comprises applying the high frequency modulated signal as a recording bias signal for the program material by summing the programming material signal and the modulating signal and recording the summed signal upon the magnetic tape.

12. Apparatus for preparing recorded audible program material which does not interfere with normal playback of the material but which renders detectable any unauthorized copies of the material which are made by magnetic tape recording with conventional high frequency bias, said apparatus comprising:

means for generating a high frequency modulated signal which varies in a predetermined manner over a selected spectrum of frequencies; and means for recording the modulated signal together with the audible program material;

whereby copying of the recorded material onto magnetic tape will produce on the tape detectable interference signals between the modulated signal and the conventional recording bias.

13. Apparatus as claimed in claim 12 wherein the generating means generates a high frequency modulated signal which frequency modulated and varies over the selected spectrum of frequencies at a rate which is within the passband of the audible program material, whereby the interference signals arising upon copying will exist as audible signals on the copied tape recording.

14. Apparatus as claimed in claim 12 wherein the means for generating the high frequency modulated signal comprises means for coding the modulated signal with preselected information, whereby the information will be communicated via the interference signals to the tape copy to identify the origin of the recorded program material.

15. Apparatus as claimed in claim 12 wherein the recording means comprises means for sensing the presence of program material suitable for audibly masking demodulated signal and means for recording the modulated signal during such masking program material.

16. Apparatus as claimed in claim 12 wherein the program material is recorded on magnetic tape, and wherein the means for recording the modulated signal together with the audible program material comprises means for first recording the audible program material on the magnetic tape and means for thereafter recording the modulated signal on the magnetic tape in superposition upon the recorded audible program material.

17. Apparatus as claimed in claim 16 wherein the high frequency modulated signal is in the form of a square wave signal, whereby modulation noise is reduced.

18. Apparatus as claimed in claim 16 wherein the recording means comprises means for sensing the presence of audible program material portions suitable for masking the modulated signal, and means for recording the modulated signal in superposition upon such portions, whereby the modulated signal remains hidden during normal playback of the program material.

19. Apparatus as claimed in claim 16 wherein the means for recording the modulated signal includes a recording head, and further comprising means for moving the recording head about its azimuth during recording of the modulated signal, whereby said interference signals will be generated despite misalignment of a playback head by means of which an unauthorized tape copy is made.

20. Apparatus as claimed in claim 19 wherein the means for moving the recording head rocks it about a center portion.

21. Apparatus as claimed in claim 12 wherein the means for recording the modulated signal together with the audible program material comprises means for applying the high frequency modulated signal as a recording bias signal for the program material by summing the programming material signal and the modulating signal and recording the summed signal upon the magnetic tape.

22. A method for preparing recorded audible program material upon magnetic recording tape which renders detectable any unauthorized copies of the audible program material upon a magnetic recording tape which are made by magnetic tape recording with a conventional high frequency bias signal, said method comprising:
   recording the audible program material upon a first magnetic recording tape for providing a predetermined information passband of frequencies of such recorded material;
   generating a square wave high frequency modulatable signal having a quiescent frequency lying above said passband;
   recording said modulatable signal on the tape together with the audible program material;
   sensing the presence of passages of program material suitable for audibly masking the presence of a modulated signal in the upper end of said passband;
   when said masking passages of program material are available, frequency modulating said square wave high frequency modulatable signal to produce frequency excursions thereof down into the upper frequencies of said passband;
   whereby copying of the recorded audible program material onto another magnetic tape will produce on the tape copy detectable interference signals between the modulated signal and the conventional recording bias signal; and
   whereby the modulated signal is impossible to be removed in the process of making such tape copy.

23. A method for preparing recorded audible program material upon magnetic recording tape, as claimed in claim 22, in which the transition time of said square wave high frequency modulatable signal is 1/6 or less of the dwell time thereof.

24. A method for preparing recorded audible program material upon magnetic recording tape, as claimed in claim 22, in which said square wave high frequency modulatable signal is employed as a high frequency bias signal in conjunction with the recording of the audible program material onto the magnetic recording tape.

25. A method for preparing recorded audible program material upon magnetic recording tape, as claimed in claim 24, in which said square wave high frequency modulatable signal is the summation of two frequency modulated signals $f_1$ and $f_2$ which are each swept over predetermined frequency spectrums, said signals $f_1$ and $f_2$ being displaced one from another by a fairly constant frequency difference $f_1$ and $f_2$ and said frequency difference lying within the passband.

26. A method for preparing recorded audible program material on a magnetic recording tape comprising:
   recording the audible program material on said tape for providing a predetermined information passband of frequencies of such recorded material, said recording being applied by a first magnetic recording head having a predetermined gap width,
   generating a square-wave high frequency modulated signal which varies in a predetermined manner over a selected spectrum of frequencies higher than said information passband of frequencies,
   said square wave having a transition time which is 1/6 or less of the dwell time thereof, and
   recording said square-wave modulated signal on said tape using a second magnetic recording head having a narrower gap width than said first head and being positioned for engaging said tape after said recorded material has been applied by said first head.

* * * * *